United States Patent
White et al.

(10) Patent No.: US 8,429,725 B2
(45) Date of Patent: *Apr. 23, 2013

(54) SYSTEM AND METHOD FOR PROVIDING A SECURE CONNECTION BETWEEN NETWORKED COMPUTERS

(75) Inventors: Eric White, Austin, TX (US); Patrick Turley, Austin, TX (US)

(73) Assignee: RPX Corporation, San Francisco, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/173,764

(22) Filed: Jun. 30, 2011

(65) Prior Publication Data
US 2011/0258687 A1    Oct. 20, 2011

Related U.S. Application Data

(63) Continuation of application No. 12/617,211, filed on Nov. 12, 2009, now Pat. No. 8,108,915, which is a continuation of application No. 10/922,041, filed on Aug. 19, 2004, now Pat. No. 7,624, 438.

(60) Provisional application No. 60/496,629, filed on Aug. 20, 2003.

(51) Int. Cl.
*G06F 7/04* (2006.01)
*G06F 15/16* (2006.01)

(52) U.S. Cl.
USPC .................... 726/5; 726/3; 726/12; 726/15

(58) Field of Classification Search .................. None
See application file for complete search history.

(56) References Cited

U.S. PATENT DOCUMENTS

| | | | |
|---|---|---|---|
| 5,623,601 A | 4/1997 | Vu | |
| 5,673,393 A | 9/1997 | Marshall et al. | |
| 5,706,427 A | 1/1998 | Tabuki | |
| 5,748,901 A | 5/1998 | Afek et al. | |
| 5,835,727 A | 11/1998 | Wong et al. | |
| 5,878,231 A | 3/1999 | Baehr et al. | |

(Continued)

FOREIGN PATENT DOCUMENTS

| | | |
|---|---|---|
| EP | 0 587 522 A2 | 3/1994 |
| WO | WO 01/77787 A3 | 10/2001 |

(Continued)

OTHER PUBLICATIONS

Pfleeger, Charles P. "Security in Computing," 1989, PTR Prentice-Hall, Inc., Chapter 10.*

(Continued)

*Primary Examiner* — Kaveh Abrishamkar
(74) *Attorney, Agent, or Firm* — Howison & Arnott, L.L.P.

(57) ABSTRACT

Embodiments disclosed herein provide a system, method, and computer program product for establishing a secure network connection between a client and a server. The client may send a connection request over a public network to the server. The server may prepare a response containing a controller and session-specific credentials. The controller may be selected to configure a tunneling protocol on the client. After being downloaded to the client, the controller configures the tunneling protocol and establishes a secure network connection with the server without user intervention. The session-specific credentials are valid until the secure network connection between the client and the server is severed.

39 Claims, 5 Drawing Sheets

U.S. PATENT DOCUMENTS

| | | | |
|---|---|---|---|
| 5,896,499 A | 4/1999 | McKelvey | |
| 5,901,148 A | 5/1999 | Bowen et al. | |
| 5,936,542 A | 8/1999 | Kleinrock et al. | |
| 5,953,506 A | 9/1999 | Kalra et al. | |
| 5,987,134 A | 11/1999 | Shin et al. | |
| 5,996,013 A | 11/1999 | Delp et al. | |
| 6,085,241 A | 7/2000 | Otis | |
| 6,088,451 A | 7/2000 | He et al. | |
| 6,092,200 A | 7/2000 | Muniyappa et al. | |
| 6,108,782 A | 8/2000 | Fletcher et al. | |
| 6,130,892 A | 10/2000 | Short et al. | |
| 6,131,116 A | 10/2000 | Riggins et al. | |
| 6,157,953 A | 12/2000 | Chang et al. | |
| 6,173,331 B1 | 1/2001 | Shimonishi | |
| 6,176,883 B1 | 1/2001 | Holloway et al. | |
| 6,185,567 B1 | 2/2001 | Ratnaraj et al. | |
| 6,194,992 B1 | 2/2001 | Short et al. | |
| 6,199,113 B1 | 3/2001 | Alegre et al. | |
| 6,205,552 B1 | 3/2001 | Fudge | |
| 6,212,558 B1 | 4/2001 | Antur et al. | |
| 6,219,706 B1 | 4/2001 | Fan et al. | |
| 6,226,752 B1 | 5/2001 | Gupta et al. | |
| 6,233,607 B1 | 5/2001 | Taylor et al. | |
| 6,243,815 B1 | 6/2001 | Antur et al. | |
| 6,266,774 B1 | 7/2001 | Sampath et al. | |
| 6,275,693 B1 | 8/2001 | Lin et al. | |
| 6,295,294 B1 | 9/2001 | Odlyzko | |
| 6,321,339 B1 | 11/2001 | French et al. | |
| 6,324,648 B1 | 11/2001 | Grantges, Jr. | |
| 6,336,133 B1 | 1/2002 | Morris et al. | |
| 6,404,743 B1 | 6/2002 | Meandzija | |
| 6,421,319 B1 | 7/2002 | Iwasaki | |
| 6,463,474 B1 | 10/2002 | Fuh et al. | |
| 6,473,793 B1 | 10/2002 | Dillon et al. | |
| 6,473,801 B1 | 10/2002 | Basel | |
| 6,477,143 B1 | 11/2002 | Ginossar | |
| 6,502,131 B1 | 12/2002 | Vaid et al. | |
| 6,502,135 B1 | 12/2002 | Munger et al. | |
| 6,516,417 B1 | 2/2003 | Pegrum et al. | |
| 6,535,879 B1 | 3/2003 | Behera | |
| 6,539,431 B1 | 3/2003 | Sitaraman et al. | |
| 6,631,416 B2 | 10/2003 | Bendinelli et al. | |
| 6,636,894 B1 | 10/2003 | Short et al. | |
| 6,643,260 B1 | 11/2003 | Kloth et al. | |
| 6,678,733 B1 | 1/2004 | Brown et al. | |
| 6,708,212 B2 | 3/2004 | Porras et al. | |
| 6,732,179 B1 | 5/2004 | Brown et al. | |
| 6,735,691 B1* | 5/2004 | Capps et al. | 713/1 |
| 6,757,740 B1 | 6/2004 | Parekh et al. | |
| 6,763,468 B2 | 7/2004 | Gupta et al. | |
| 6,785,252 B1 | 8/2004 | Zimmerman et al. | |
| 6,789,110 B1 | 9/2004 | Short et al. | |
| 6,789,118 B1 | 9/2004 | Rao | |
| 6,798,746 B1 | 9/2004 | Kloth et al. | |
| 6,804,783 B1 | 10/2004 | Wesinger et al. | |
| 6,816,903 B1 | 11/2004 | Rakoshitz et al. | |
| 6,823,385 B2 | 11/2004 | McKinnon et al. | |
| 6,834,341 B1 | 12/2004 | Bahl et al. | |
| 6,839,759 B2 | 1/2005 | Larson et al. | |
| 6,876,668 B1 | 4/2005 | Chawla et al. | |
| 6,907,530 B2 | 6/2005 | Wang | |
| 6,917,622 B2 | 7/2005 | McKinnon et al. | |
| 6,976,089 B2 | 12/2005 | Na et al. | |
| 6,996,625 B2 | 2/2006 | Kaplan et al. | |
| 7,013,331 B2 | 3/2006 | Das | |
| 7,085,385 B2 | 8/2006 | Frantz et al. | |
| 7,085,854 B2 | 8/2006 | Keane et al. | |
| 7,092,727 B1 | 8/2006 | Li et al. | |
| 7,120,934 B2 | 10/2006 | Ishikawa | |
| 7,143,283 B1 | 11/2006 | Chen et al. | |
| 7,143,435 B1 | 11/2006 | Droms et al. | |
| 7,146,639 B2 | 12/2006 | Bartal et al. | |
| 7,181,017 B1 | 2/2007 | Nagel et al. | |
| 7,181,542 B2 | 2/2007 | Tuomenoksa et al. | |
| 7,181,766 B2 | 2/2007 | Bendinelli et al. | |
| 7,185,073 B1 | 2/2007 | Gai et al. | |
| 7,185,358 B1 | 2/2007 | Schreiber et al. | |
| 7,185,368 B2 | 2/2007 | Copeland, III | |
| 7,188,180 B2 | 3/2007 | Larson et al. | |
| 7,194,554 B1 | 3/2007 | Short et al. | |
| 7,216,173 B2 | 5/2007 | Clayton et al. | |
| 7,257,833 B1 | 8/2007 | Parekh et al. | |
| 7,266,754 B2 | 9/2007 | Shah | |
| 7,272,646 B2 | 9/2007 | Cooper et al. | |
| 7,290,288 B2 | 10/2007 | Gregg et al. | |
| 7,310,613 B2 | 12/2007 | Briel et al. | |
| 7,316,029 B1 | 1/2008 | Parker et al. | |
| 7,324,551 B1 | 1/2008 | Stammers | |
| 7,324,947 B2 | 1/2008 | Jordan et al. | |
| 7,325,042 B1 | 1/2008 | Soscia et al. | |
| 7,386,888 B2 | 6/2008 | Liang et al. | |
| 7,406,530 B2 | 7/2008 | Brown et al. | |
| 7,418,504 B2 | 8/2008 | Larson et al. | |
| 7,420,956 B2 | 9/2008 | Karaoguz et al. | |
| 7,444,669 B1 | 10/2008 | Bahl et al. | |
| 7,448,075 B2 | 11/2008 | Morand et al. | |
| 7,454,792 B2 | 11/2008 | Cantrell et al. | |
| 7,490,151 B2 | 2/2009 | Munger et al. | |
| 7,509,625 B2 | 3/2009 | Johnston et al. | |
| 7,587,512 B2 | 9/2009 | Ta et al. | |
| 7,590,728 B2 | 9/2009 | Tonnesen et al. | |
| 7,610,621 B2 | 10/2009 | Turley et al. | |
| 7,624,438 B2* | 11/2009 | White et al. | 726/15 |
| 7,634,805 B2 | 12/2009 | Aroya | |
| 7,665,130 B2 | 2/2010 | Johnston et al. | |
| 8,032,933 B2 | 10/2011 | Turley et al. | |
| 8,108,915 B2* | 1/2012 | White et al. | 726/5 |
| 8,117,639 B2 | 2/2012 | MacKinnon et al. | |
| 8,224,983 B2 | 7/2012 | Ta et al. | |
| 2001/0038639 A1 | 11/2001 | McKinnon et al. | |
| 2001/0038640 A1 | 11/2001 | McKinnon et al. | |
| 2001/0038645 A1 | 11/2001 | McKinnin et al. | |
| 2001/0039576 A1 | 11/2001 | Kanada | |
| 2001/0039582 A1 | 11/2001 | McKinnon et al. | |
| 2002/0013844 A1 | 1/2002 | Garrett et al. | |
| 2002/0021665 A1 | 2/2002 | Bhagavath et al. | |
| 2002/0023160 A1 | 2/2002 | Garrett et al. | |
| 2002/0023210 A1 | 2/2002 | Tuomenoksa et al. | |
| 2002/0026503 A1 | 2/2002 | Bendinelli et al. | |
| 2002/0026531 A1 | 2/2002 | Keane et al. | |
| 2002/0029260 A1 | 3/2002 | Dobbins et al. | |
| 2002/0029276 A1 | 3/2002 | Bendinelli et al. | |
| 2002/0035699 A1 | 3/2002 | Crosbie | |
| 2002/0042883 A1 | 4/2002 | Roux et al. | |
| 2002/0046264 A1 | 4/2002 | Dillon et al. | |
| 2002/0052950 A1 | 5/2002 | Pillai et al. | |
| 2002/0053031 A1 | 5/2002 | Bendinelli et al. | |
| 2002/0055968 A1 | 5/2002 | Wishoff et al. | |
| 2002/0056008 A1 | 5/2002 | Keane et al. | |
| 2002/0059408 A1 | 5/2002 | Pattabhiraman et al. | |
| 2002/0075844 A1 | 6/2002 | Hagen | |
| 2002/0085719 A1 | 7/2002 | Crosbie | |
| 2002/0087713 A1 | 7/2002 | Cunningham | |
| 2002/0090089 A1* | 7/2002 | Branigan et al. | 380/270 |
| 2002/0091859 A1 | 7/2002 | Tuomenoksa et al. | |
| 2002/0091944 A1 | 7/2002 | Anderson et al. | |
| 2002/0099829 A1 | 7/2002 | Richards et al. | |
| 2002/0112183 A1 | 8/2002 | Baird, III et al. | |
| 2002/0112186 A1 | 8/2002 | Ford et al. | |
| 2002/0120741 A1 | 8/2002 | Webb et al. | |
| 2002/0123335 A1 | 9/2002 | Luna et al. | |
| 2002/0124078 A1 | 9/2002 | Conrad | |
| 2002/0124103 A1 | 9/2002 | Maruyama et al. | |
| 2002/0129143 A1 | 9/2002 | McKinnon, III et al. | |
| 2002/0131404 A1 | 9/2002 | Mehta et al. | |
| 2002/0133581 A1 | 9/2002 | Schwartz et al. | |
| 2002/0133586 A1 | 9/2002 | Shanklin et al. | |
| 2002/0133589 A1 | 9/2002 | Gubbi et al. | |
| 2002/0136226 A1 | 9/2002 | Christoffel et al. | |
| 2002/0138631 A1 | 9/2002 | Friedel et al. | |
| 2002/0138762 A1 | 9/2002 | Horne | |
| 2002/0138763 A1 | 9/2002 | Delany et al. | |
| 2002/0143964 A1 | 10/2002 | Guo et al. | |
| 2002/0152284 A1 | 10/2002 | Cambray et al. | |
| 2002/0162030 A1 | 10/2002 | Brezak et al. | |
| 2002/0164952 A1 | 11/2002 | Singhal et al. | |
| 2002/0165949 A1 | 11/2002 | Na et al. | |

| | | | | | | |
|---|---|---|---|---|---|---|
| 2002/0165990 | A1 | 11/2002 | Singhal et al. | 2008/0066096 A1 | 3/2008 | Wollmershauser et al. |
| 2002/0169867 | A1 | 11/2002 | Mann et al. | 2008/0098464 A1 | 4/2008 | Mizrah |
| 2002/0174227 | A1 | 11/2002 | Hartsell et al. | 2008/0120661 A1 | 5/2008 | Ludvig et al. |
| 2002/0178282 | A1 | 11/2002 | Mysore et al. | 2008/0147840 A1 | 6/2008 | Roelens et al. |
| 2002/0199007 | A1* | 12/2002 | Clayton et al. ............ 709/230 | 2008/0276305 A1 | 11/2008 | Chan et al. |
| 2003/0041104 | A1 | 2/2003 | Wingard et al. | 2009/0279567 A1 | 11/2009 | Ta et al. |
| 2003/0043846 | A1 | 3/2003 | Purpura et al. | 2010/0064356 A1 | 3/2010 | Johnston et al. |
| 2003/0046370 | A1 | 3/2003 | Courtney | 2010/0192213 A1 | 7/2010 | Ta et al. |
| 2003/0055994 | A1 | 3/2003 | Herrmann et al. | 2011/0219444 A1 | 9/2011 | Turley et al. |
| 2003/0059038 | A1 | 3/2003 | Meyerson et al. | 2012/0096517 A1 | 4/2012 | White et al. |
| 2003/0061506 | A1 | 3/2003 | Cooper | 2012/0117615 A1 | 5/2012 | MacKinnon et al. |
| 2003/0069955 | A1 | 4/2003 | Gieseke et al. | | | |
| 2003/0069956 | A1 | 4/2003 | Gieseke et al. | FOREIGN PATENT DOCUMENTS | | |
| 2003/0070170 | A1 | 4/2003 | Lennon | WO | WO 02/09458 A2 | 1/2002 |
| 2003/0078784 | A1 | 4/2003 | Jordan et al. | WO | WO 02/23825 A1 | 3/2002 |
| 2003/0087629 | A1 | 5/2003 | Juitt et al. | WO | WO 02/41587 A2 | 5/2002 |
| 2003/0110073 | A1 | 6/2003 | Briel et al. | WO | WO 02/077820 A1 | 10/2002 |
| 2003/0115247 | A1 | 6/2003 | Simpson et al. | WO | WO 03/021890 A1 | 3/2003 |
| 2003/0123442 | A1 | 7/2003 | Drucker et al. | WO | WO 03/098461 A1 | 11/2003 |
| 2003/0126608 | A1 | 7/2003 | Safadi et al. | WO | WO 2004/034229 A2 | 4/2004 |
| 2003/0135753 | A1 | 7/2003 | Batra et al. | WO | WO 2004/036371 A2 | 4/2004 |
| 2003/0149751 | A1 | 8/2003 | Bellinger et al. | WO | WO 2005/020035 A2 | 3/2005 |
| 2003/0154399 | A1 | 8/2003 | Zuk | | | |
| 2003/0159072 | A1 | 8/2003 | Bellinger et al. | | | |
| 2003/0163603 | A1 | 8/2003 | Fry et al. | | | |
| 2003/0172167 | A1 | 9/2003 | Judge et al. | | | |
| 2003/0177477 | A1 | 9/2003 | Fuchs | | | |
| 2003/0182420 | A1 | 9/2003 | Jones et al. | | | |
| 2003/0212800 | A1 | 11/2003 | Jones et al. | | | |
| 2003/0212900 | A1 | 11/2003 | Liu et al. | | | |
| 2003/0217126 | A1 | 11/2003 | Polcha et al. | | | |
| 2004/0015719 | A1 | 1/2004 | Lee | | | |
| 2004/0047356 | A1 | 3/2004 | Bauer | | | |
| 2004/0049586 | A1 | 3/2004 | Ocepek et al. | | | |
| 2004/0064351 | A1 | 4/2004 | Mikurak | | | |
| 2004/0064560 | A1 | 4/2004 | Zhang et al. | | | |
| 2004/0064836 | A1 | 4/2004 | Ludvig et al. | | | |
| 2004/0073941 | A1 | 4/2004 | Ludvig et al. | | | |
| 2004/0083295 | A1 | 4/2004 | Amara et al. | | | |
| 2004/0085906 | A1 | 5/2004 | Ohtani | | | |
| 2004/0093513 | A1 | 5/2004 | Cantrell | | | |
| 2004/0103426 | A1 | 5/2004 | Ludvig et al. | | | |
| 2004/0107290 | A1 | 6/2004 | Kaplan et al. | | | |
| 2004/0122956 | A1 | 6/2004 | Myers et al. | | | |
| 2004/0172557 | A1 | 9/2004 | Nakae et al. | | | |
| 2004/0177276 | A1 | 9/2004 | MacKinnon et al. | | | |
| 2004/0179822 | A1 | 9/2004 | Tsumagari et al. | | | |
| 2004/0181816 | A1 | 9/2004 | Kim et al. | | | |
| 2004/0199635 | A1 | 10/2004 | Ta et al. | | | |
| 2004/0210633 | A1 | 10/2004 | Brown et al. | | | |
| 2004/0215957 | A1 | 10/2004 | Moineau et al. | | | |
| 2004/0268149 | A1 | 12/2004 | Aaron | | | |
| 2004/0268234 | A1 | 12/2004 | Sampathkumar et al. | | | |
| 2005/0021686 | A1 | 1/2005 | Jai et al. | | | |
| 2005/0021975 | A1 | 1/2005 | Liu | | | |
| 2005/0044350 | A1 | 2/2005 | White et al. | | | |
| 2005/0044422 | A1 | 2/2005 | Cantrell | | | |
| 2005/0066200 | A1 | 3/2005 | Bahl et al. | | | |
| 2005/0091303 | A1 | 4/2005 | Suzuki | | | |
| 2005/0138358 | A1 | 6/2005 | Bahl et al. | | | |
| 2005/0138416 | A1 | 6/2005 | Qian et al. | | | |
| 2005/0149721 | A1 | 7/2005 | Lu | | | |
| 2005/0193103 | A1 | 9/2005 | Drabik | | | |
| 2005/0195854 | A1 | 9/2005 | Agmon et al. | | | |
| 2005/0204022 | A1 | 9/2005 | Johnston et al. | | | |
| 2005/0204031 | A1 | 9/2005 | Johnston et al. | | | |
| 2005/0204050 | A1 | 9/2005 | Turley | | | |
| 2005/0204168 | A1 | 9/2005 | Johnston et al. | | | |
| 2005/0204169 | A1 | 9/2005 | Tonnesen | | | |
| 2005/0204402 | A1 | 9/2005 | Turley et al. | | | |
| 2006/0036723 | A1 | 2/2006 | Yip et al. | | | |
| 2006/0168229 | A1 | 7/2006 | Shim et al. | | | |
| 2006/0168454 | A1 | 7/2006 | Venkatachary et al. | | | |
| 2006/0173992 | A1 | 8/2006 | Weber et al. | | | |
| 2006/0184618 | A1 | 8/2006 | Kurup et al. | | | |
| 2007/0073718 | A1 | 3/2007 | Ramer et al. | | | |
| 2007/0186113 | A1 | 8/2007 | Cuberson et al. | | | |
| 2007/0208936 | A1 | 9/2007 | Ramos Robles | | | |
| 2007/0268878 | A1 | 11/2007 | Clements | | | |

OTHER PUBLICATIONS

Office Action for U.S. Appl. No. 12/753,390, mailed Dec. 8, 2011, 19 pgs.

Notice of Allowance for U.S. Appl. No. 12/617,211, mailed Dec. 12, 2011, 8 pgs.

Notice of Allowance issued for U.S. Appl. No. 12/753,390, mailed Mar. 16, 2012, 5 pages.

Office Action for U.S. Appl. No. 12/619,560, mailed May 9, 2012, 7 pgs.

Bauer, Mick, Designing and Using DMZ Networks to Protect Internet Servers, Linux Journal, Mar. 1, 2001, 6 pgs. at http://linuxjournal.com/article/4415, printed Mar. 22, 2012.

Office Action for U.S. Appl. No. 13/092,488, mailed Jun. 11, 2012, 7 pgs.

Lingblom, Marie, Bluesocket's New Gateway Based on Open Standards—WGX-4000 Switch Wireless Gateway, CRN, Burlington, MA, found at www.crn.channelsupersearch.com, Apr. 21, 2003, 2 pgs.

"Boingo Wireless Service Installed at LaGuardia Airport," Jun. 17, 2003, Copyright 2003 M2Communications Ltd., found at www.findarticles.com, Dec. 8, 2003, 1 pg.

"West Point Unwired: the Military Academy at West Point Continues to Lead the Way in High-Tech Curriculum with Wireless Classroom Networking," Communication News, Jun. 2003, Copyright 2003 M2 Communications Ltd., found at www.findarticles.com, 5 pgs., printed Dec. 8, 2003.

Molta, Dave, "Wireless Hotspots Heat Up," Mobile & Wireless Technology, pp. 1-8, May 15, 2003, Copyright 2003 M2Communications Ltd., found at www.networkcomputing.com, printed Dec. 8, 2003, 8 pgs.

Jackson, William, "Wireless at West Point: Officers of the Future Use IT in Class Now, in the Field Later (Technology Report)," Apr. 21, 2003, GCN, pp. 1-3, www.gcn.com.

Lingblom, Marie, Granite Develops SMB Strategy, CRN, San Jose, CA, Jun. 23, 2003, 2 pgs.

Dornan, Andy "Wireless LANs: Freedom vs. Security?" Network Magazine, Jul. 2003, pp. 36-39, www.networkmagazine.com.

O'Shea, Dan, "PCTEL looks past patent suit toward fusion of Wi-Fi, PC" Telephony.online, Jun. 2, 2003, pp. 1-2, found at www.telephonyonline.com, Primedia Business Magazines and Media, printed Dec. 8, 2003.

O'Shea, Dan, "Boingo to Launch Initiative Aimed at Carrier Market" Telephony.online, Mar. 10, 2003, 1 pg., found at www.telephonyonline.com, Primedia Business Magazines and Media, printed Dec. 8, 2003.

International Search Report for International Patent Application No. PCT/US03/32912, completed Mar. 22, 2004, mailed Apr. 8, 2004, 6 pgs.

International Search Report for International Patent Application No. PCT/US03/32268, completed Oct. 17, 2004, mailed Oct. 29, 2004, 6 pgs.

Fan, Chen, et al, "Distributed Real Time Intrusion Detection System for 3G," Proceedings of ICCC2004, 2004, pp. 1566-1570.

Yu, Zhao-xu et al., "Fuzzy Logic Based Adaptive Congestion Control Scheme for High-Speed Network," vol. 33, No. 4, Information and Control, Aug. 2004, pp. 389-393 (with English abstract).

Hamano, Takafumi et al., "A Redirection-Based Defense Mechanism Against Flood-Type Attacks in Large Scale ISP Networks," 10th Asia-Pacific Conf. on Comm. and 5th Int'l Symposium on Multi-Dimensional Mobile Comm., 2004, pp. 543-547, IEEE #07803-8601-09/04.

Sarolahti, Pasi, "Congestion Control on Spurious TCP Retransmssion Timeouts," Globecom 2003, pp. 682-686, IEEE #0-7803-7974-8.

Estevez-Tapiador, Juan M., et al., "Measuring Normality in HTTP Traffic for Anomaly-Based Intrusion Detection," Computer Networks 45 (2004), pp. 175-193, available at www.sciencedirect.com, El Sevier 2004 #13891286.

Xing, Xu-Jia, et al., "A Survey of Computer Vulnerability Assessment," Chinese Journal of Computers, vol. 27, No. 1, Jan. 2004, pp. 1-11 (with English abstract).

Wen et al. "Development of a Snort-Based Security Network Management and Real-Time Intrusion Detection System," Journal of Beijing Normal Univ. (Natural Science), vol. 40, No. 1, Feb. 2004, pp. 40-43 (with English abstract).

Thottethodi, Methune, et al., "Exploiting Global Knowledge to Achieve Self-Tuned Congestion Control for k-Ary n-Cube Networks," IEEE Transactions on Parallel and Distributed Systems, vol. 15, No. 3, Mar. 2004, pp. 257-272, IEEE #1045-9219/04.

Trabelsi, Zouheir, et al., "Malicious Sniffing Systems Detection Platform," 2004 IEEE, pp. 201-207, IEEE #0-7695-2068-5/04.

Guangzhi, Qu, et al., "A Framework for Network Vulnerability Analysis," Proceedings of the IASTED Int'l Conf., Comm., Internet & Information Tech., Nov. 18-20, 2004, St. Thomas, US Virgin Islands, pp. 289-294.

Albuquerque, Celio, et al., "Network Border Patrol: Preventing Congestion Collapse and Promoting Fairness in the Internet," IEEE/ACM Transactions on Networking, vol. 12, No. 1, Feb. 2004, pp. 173-186, IEEE #1063-6692/04.

Wirbel, Loring, "Security Stampede Could Flatten IPSec," Network Magazine, Jan. 2004, p. 12, available at www.networkmagazine.com.

MacLeod, Calum, "Freeing the Shackles with Secure Remote Working," Comtec, Oct. 2003, pp. 66-67.

Fisher, Dennis, "SSL Simplifies VPN Security," IT Week, Nov. 10, 2003, p. 40, available at www.eweek.com/security.

Conry-Murray, Andrew, "SSL VPNs: Remote Access for the Masses," Network Magazine, Oct. 2003, pp. 26-32, available at www.networkmagazine.com.

"Permeo Supports Microsoft Network Access Protection for Simplified Secure Remote Access; Permeo's Base5 Support of Microsoft Technology Provides "Zero Touch" Policy Enforcement", Apr. 25, 2005, 2 pgs., Newswire, found at www.nerac.com. #NDN-121-0552-8254-9.

Permeo Drives Out Operational Costs, Simplifies Secure Remote Access, Mar. 25, 2005, 2 pgs., Newswire, found at www.nerac.com. #NDN-121-0549-5967-5.

"Netilla Lauches SSL VPN for Citrix. (Industry Briefs) (Virtual Private Networks) (Brief Article)," Sep. 20, 2004, 2 pgs., Computer Reseller News, found at www.nerac.com. #NDN-218-0991-7652-9.

"Netilla Lauches Secure Gateway Appliance Family of Application-Specific SSL VPN Products; Initial SGA-C Model Provides Secure Remote Access to Citrix MetaFrame Presentation Server Installations . . . " Sep. 13, 2004, 3 pgs., PR Newswire, found at www.nerac.com. #NDN-218-0987-0667-2.

"Secure Remote Access.(Network Security) (VPN Gateway 4400 Series) (Brief Article)," Mar. 1, 2004, 2 pgs., Communication News, vol. 41, found at www.nerac.com. #NDN-218-0925-2711-6.

"Fortinet and Aventail Deliver Joint Solution for Clientless Remote Access with High-Performance Antivirus Protection; Integrated SSL VPN and Antivirus Offering Provides Clientless Remote Access with Complete Content Security", Jan. 5, 2004, 3 pgs., PR Newswire, found at www.nerac.com. #NDN-218-0845-8319-2.

Hamblen, Matt, "Cisco Targets SSL VPN Vendors, Adds Support for Clientless Security Protocol: Installed Base of VPN Devices May Give it an Edge, Despite Late Entry," Nov. 17, 2003, 3 pgs., Computerworld, vol. 37, No. 46, found at www.nerac.com. #NDN-218-0841-5076-0.

Hamzeh, K., et al., "Point-to-Point Tunneling Protocol—PPTP RFC 2637" Network Working Groups, Jul. 1999, pp. 1-54, Microsoft Corporation.

International Search Report and Written Opinion for International Application No. PCT/US04/29249, completed Nov. 28, 2005, mailed Dec. 15, 2005, 10 pgs.

Pfleeger, Charles P., Computer Network Security, Security in Computing, 1989, pp. 364-415, Ch. 10, PTR Prentice-Hall, Inc., Englewood Cliffs, NJ.

Office Action for U.S. Appl. No. 10/922,041, mailed Jul. 13, 2007, 20 pgs.

Stone, David, "Securing Wireless LANs with VPN", Intel Information Technology White Paper, Intel Corp., May 2006, 8 pgs. Order N#313185-001US.

Office Action for U.S. Appl. No. 10/683,317, mailed Oct. 9, 2007, 20 pgs.

Office Action for U.S. Appl. No. 10/687,002, mailed Oct. 18, 2007, 10 pgs.

Office Action for U.S. Appl. No. 11/078,223, mailed Oct. 31, 2007, 8 pgs.

Office Action for U.S. Appl. No. 11/076,652, mailed Jan. 25, 2008, 9 pgs.

Office Action for U.S. Appl. No. 10/687,002, mailed Apr. 17, 2008, 12 pgs.

Office Action for U.S. Appl. No. 10/683,317, mailed Jun. 9, 2008, 15 pgs.

Office Action for U.S. Appl. No. 11/076,672, mailed Jul. 9, 2008, 12 pgs.

Office Action for U.S. Appl. No. 11/076,652, mailed Jul. 22, 2008, 8 pgs.

Office Action for U.S. Appl. No. 11/076,591, mailed Aug. 13, 2008, 10 pgs.

Office Action for U.S. Appl. No. 11/076,719, mailed Sep. 4, 2008, 7 pgs.

SBC Technology Resources, Inc., XNMP-XML Network Management Protocol and Interface, Jul. 19, 2002, pp. 1-9, http://www.ietf.org/proceedings/02jul/slides.

Shim, Choon B., "XNMP for IP Telephony Management," Enterprise Networks & Servers, Jun. 2, 2006, 7 pgs.

Office Action for U.S. Appl. No. 11/076,652, mailed Dec. 11, 2008, 8 pgs.

Office Action for U.S. Appl. No. 10/687,002, mailed Jan. 7, 2009, 14 pgs.

Office Action for U.S. Appl. No. 11/076,672, mailed Feb. 3, 2009, 10 pgs.

Oh, et al., "Interaction Translation Methods for XML/SNAP Gateway," Jul. 11, 2003, retrieved from http://web-archive.org/web/20030711162412/http://dpnm.postech.ac.kr/papers/DSOM/xml-snmp-gateway/xml-snmp-gateway.pdf, pp. 1-12.

Office Action for U.S. Appl. No. 10/683,317, mailed Feb. 11, 2009, 17 pgs.

Office Action for U.S. Appl. No. 11/076,591, mailed Feb. 13, 2009, 26 pgs.

International Preliminary Report on Patentability for International Patent Application No. PCT/US03/032268 completed Jan. 4, 2005, 3 pgs.

International Preliminary Report on Patentability for International Patent Application No. PCT/US03/032912 completed Jun. 28, 2004, 3 pgs.

International Preliminary Report on Patentability (Ch. I) of the International Searching Authority for International Patent Application No. PCT/US04/029249 issued Feb. 21, 2006, 6 pgs.

Office Action for U.S. Appl. No. 11/076,719, mailed Mar. 17, 2009, 8 pgs.

Office Action for U.S. Appl. No. 10/922,041, mailed Dec. 6, 2005, 10 pgs.

Office Action for U.S. Appl. No. 10/922,041, mailed Mar. 30, 2006, 18 pgs.

Office Action for U.S. Appl. No. 10/922,041, mailed Aug. 11, 2006, 19 pgs.
Office Action for U.S. Appl. No. 10/922,041, mailed Jan. 30, 2007, 20 pgs.
Office Action for U.S. Appl. No. 10/683,317, mailed Apr. 5, 2007, 6 pgs.
Office Action for U.S. Appl. No. 10/687,002, mailed May 2, 2007, 10 pgs.
Office Action for U.S. Appl. No. 10/922,041, mailed May 8, 2009, 13 pgs.
Office Action for U.S. Appl. No. 11/076,672, mailed Jul. 21, 2009, 11 pgs.
Notice of Allowability for U.S. Appl. No. 11/076,646, mailed Jul. 24, 2009, 7 pgs.
Crandell et al., "A Secure and Transparent Firewall Web Proxy," Oct. 2003, USENIX, Retrieved from the internet on Jul. 15, 2009: <URL: http://www.usenix.org/event/lisa03/tech/full_papers/crandell/crandell.pdf>.
Sommerlad, "Reverse Proxy Patterns," 2003 Retrieved from the Internet on Jul. 15, 2009, 27 pages; <URL: http://www.modsecurity.org/archive/ReverseProxy-book-1.pdf>.
Office Action for U.S. Appl. No. 11/076,591, mailed Aug. 6, 2009, 29 pgs.
Office Action for U.S. Appl. No. 10/683,317, mailed Aug. 18, 2009, 17 pgs.
Rashti et al, "A Multi-Dimensional Packet Classifier for NP-Based Firewalls," Proceedings of the 2004 Int'l Symposium on Applications and the Internet, Jan. 2004, 5 pages, from the internet, printed Aug. 12, 2009: <URL: http://ieeexplore.ieee.org/stamp/stamp.jsp?tp=&arnumber=12661238&isnumber=28312>.
Williamson, Matthew, "Throttling Viruses: Restricting Propagation to Defeat Malicious Mobile Code," Proceedings of the 18th Annual Computer Security Applications Conference, 2002 IEEE, 8 pages.
Williamson, et al, "Virus Throttling," Virus Bulletin Research Feature 1, Mar. 2003, 4 pgs.
Office Action for U.S. Appl. No. 11/076,672, mailed Jan. 7, 2010, 9 pgs.
Office Action for U.S. Appl. No. 11/076,591, mailed Feb. 2, 2010, 34 pgs.
Office Action for U.S. Appl. No. 11/076,591, mailed Jul. 20, 2010, 33 pgs.
Office Action for U.S. Appl. No. 10/683,317, mailed Jul. 23, 2010, 9 pgs.
Office Action for U.S. Appl. No. 12/506,140, mailed Sep. 1, 2010, 11 pgs.
Office Action for U.S. Appl. No. 12/579,566, mailed Oct. 6, 2010, 7 pgs.
"Discussion of Conceptual Difference Between Cisco IOS Classic and Zone-Based Firewalls," Oct. 2007, Cisco Systems, Inc., San Jose, CA, 4 pgs.
Cisco IOS Firewall Zone-Based Policy Firewall, Release 12.4(6)T, Technical Discussion, Feb. 2006, 77 pgs., Cisco Systems, Inc., San Jose, CA.
Zone-Based Policy Firewall Design and Application Guide, Document ID: 98628, Sep. 13, 2007, 49 pgs., Cisco Systems, Inc., San Jose, CA.
SP Maj, W Makairanondh, D Veal, "An Evaluation of Firewall Configuration Methods," IJSCSNS International Journal of Computer Science and Network Security, vol. 10, No. 8, Aug. 2010, 7 pgs.
Using VPN with Zone-Based Policy Firewall, May 2009, Cisco Systems, Inc., San Jose, CA, 10 pgs.
Cisco IOS Firewall Classic and Zone-Based Virtual Firewall Application Configuration Example, Document ID: 100595, Feb. 12, 2008, 20 pgs., Cisco Systems, Inc., San Jose, CA.
Class-Based Policy Provisioning: Introducing Class-Based Policy Language (CPL), Aug. 2008, 36 pgs., Cisco Systems, Inc., San Jose, CA.
Cisco IOS Zone Based Firewall Example, at http://www.linickx.com/archives/2945/cisco-ios-zon..., printed Dec. 7, 2010, 6 pgs., LINICKX.com.
Zone-Based Policy Firewall, Published Feb. 22, 2006, Updated Jun. 19, 2006, 46 pgs., Cisco Systems, Inc., San Jose, CA.
Applying Zone-based Firewall Policies in Cisco Security Manager, Published Mar. 2009, Revised Sep. 2009, Cisco Systems, Inc., San Jose, CA.
"FreeBSD Handbook, Chapter 30 Firewalls," 2003, found at www.freebsd.org/doc/handbook/firewalls-ipfw.html, printed Dec. 27, 2010, 13 pgs.
Watters, Paul, "Solaris 8 Administrator's Guide, Chapter 4, Network Configuration," O'Reilly & Associates, Inc., Jan. 2002, 17 pgs.
Spitzner, Lance, "Configuring network interface cards; getting your interfaces to talk," Mar. 23, 2004, 4 pgs.
Gite, Vivek, "Redhat/CentOS/Fedora Linux Open Port," Sep. 13, 2007, found at www.cyberciti.biz/faq/howto-rhel-linux-open-port-using-iptables/ printed Jan. 3, 2011, 7 pgs.
Office Action for U.S. Appl. No. 10/683,317, mailed Jan. 3, 2011, 12 pgs.
Office Action for U.S. Appl. No. 12/617,211, mailed Feb. 3, 2011, 14 pgs.
"Managing Firewall Services," User Guide for Cisco Security Manager 3.3.1, Oct. 2009, Ch. 11, 90 pgs., Cisco Systems, Inc., San Jose, CA.
"Cisco Common Classification Policy Language," Cisco Router and Security Device Manager 2.4 User's Guide, Ch. 34, 2007, 32 pgs., Cisco Systems, Inc., San Jose, CA.
Guide to User Documentation for Cisco Security Manager 4.0, Jun. 18, 2010, Cisco Systems, Inc., San Jose, CA.
Cisco Configuration Professional: Zone-Based Firewall Blocking Peer to Peer Traffic Configuration Example, Document ID: 112237, Updated Dec. 3, 2010, 25 pgs., Cisco Systems, Inc., San Jose, CA.
Tuning Cisco IOS Classic and Zone-Based Policy Firewall Denial-of-Service Protection, 2006, 10 pgs., Cisco Systems, Inc., San Jose, CA.
Holuska, Marty, Using Cisco IOS Firewalls to Implement a Network Security Policy, Fort Hays State University/INT 490, printed Dec. 6, 2010, 5 pgs., http://quasarint.com/Capstone/zb_policy.php.
Cisco Feature Navigator, Cisco Systems, Inc., San Jose, CA, printed on Dec. 2, 2010, 4 pgs., at http://tools.cisco.com/ITDIT/CFN/Dispatch.
Office Action for U.S. Appl. No. 12/506,140, mailed Feb. 18, 2011, 13 pgs.
Notice of Allowance for U.S. Appl. No. 12/579,566, mailed Mar. 23, 2011, 12 pgs.
Notice of Allowance for U.S. Appl. No. 12/579,566, mailed May 13, 2011, 8 pgs.
Office Action for U.S. Appl. No. 10/683,317, mailed Jun. 8, 2011, 15 pgs.
Office Action for U.S. Appl. No. 12/617,211, mailed Jul. 19, 2011, 18 pgs.
Office Action for U.S. Appl. No. 12/506,140, mailed Aug. 4, 2011, 18 pgs.
Notice of Allowance for U.S. Appl. No. 12/579,566, mailed Aug. 26, 2011, 9 pgs.
Alshamsi, Abdelnasir, et al., "A Technical Comparison of IPSec and SSL," Tokyo University of Technology, Jul. 8, 2004, 10 pages.
Fisher, Dennis, "NetScreen to Acquire Neoteris," IT Security & Network Security News, Oct. 6, 2003, 1 page.
Demaria, Mike, "Faster Than a Speeding VPN—Super Remote Access With Neoteris IVE," Network Computing, Sep. 9, 2002, http://www.networkcomputing.com/data-protection/2296249, 3 pages.
Snyder, Joel, "SSL VPN Gateways," Networkworld, Jan. 12, 2004, http://www.networkworld.com/reviews/2004/0112revmain.html, 10 pages.
"NetExtender for SSL-VPN," SonicWALL SSL-VPN NetExtender, Apr. 27, 2006, 30 pages.
"IPSec vs. SSL VPN: Transition Criteria and Methodology," 2007 Sonicwall, 13 pages.
Fisher, Dennis, "Symantec Acquires SSL VPN Vendor," IT Security & Network Security News, Oct. 20, 2003, http://www.eweek.com/index2.php?option=content&task=v... 1 page.
Notice of Allowance issued in U.S. Appl. No. 12/617,211, mailed Nov. 10, 2011, 8 pages.
Notice of Allowance issued in U.S. Appl. No. 10/683,317, mailed Nov. 28, 2011, 11 pages.

* cited by examiner

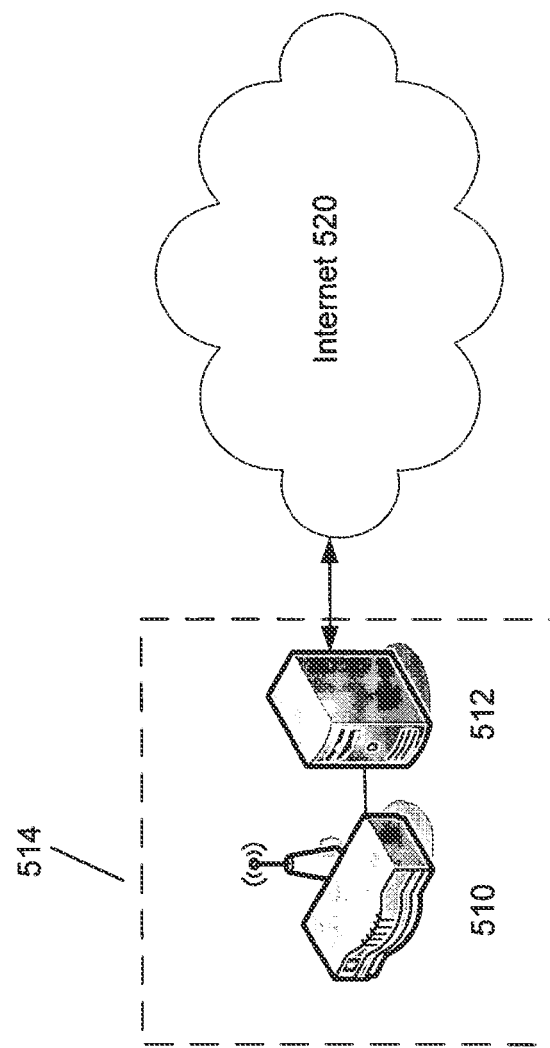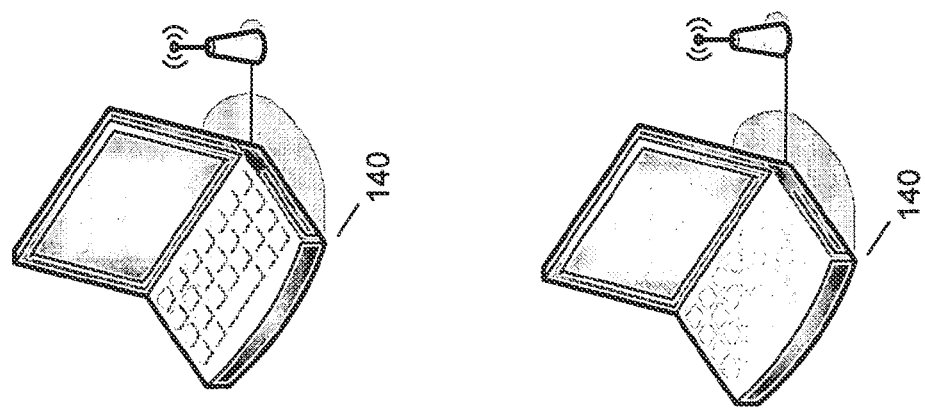
FIGURE 5

SYSTEM AND METHOD FOR PROVIDING A SECURE CONNECTION BETWEEN NETWORKED COMPUTERS

CROSS REFERENCE TO RELATED APPLICATIONS

This application is a continuation of U.S. patent application Ser. No. 12/617,211, filed Nov. 12, 2009 now U.S. Pat. No. 8,108,915, by inventors Eric White and Patrick Turley, entitled "SYSTEM AND METHOD FOR PROVIDING A SECURE CONNECTION BETWEEN NETWORKED COMPUTERS," now U.S. Pat. No. 8,108,915, issued on Jan. 31, 2012, which is a continuation of U.S. patent application Ser. No. 10/922,041 filed Aug. 19, 2004, by inventors Eric White and Patrick Turley, entitled "SYSTEM AND METHOD FOR PROVIDING A SECURE CONNECTION BETWEEN NETWORKED COMPUTERS," issued as U.S. Pat. No. 7,624,438, on Nov. 24, 2009, which in turn claims a benefit of priority under 35 U.S.C. Section 119(e) to the filing date of U.S. Provisional Application No. 60/496,629, filed Aug. 20, 2003, by inventors Eric White and Patrick Turley, entitled "SYSTEM AND METHOD FOR PROVIDING A SECURE CONNECTION BETWEEN NETWORKED COMPUTERS," the entire contents of which are hereby incorporated by reference herein for all purposes.

TECHNICAL FIELD

Embodiments disclosed herein relate generally to methods and systems for computer connectivity and, more particularly, to methods and systems for establishing and providing secure connections between computers.

BACKGROUND

The use of computer networks to store data and provide information to users is increasingly common. In fact, in many cases it may be necessary for a computer to be connected to a specific network to retrieve data desired or needed by a user. To connect to a specific network, a user at a client computer may utilize a network connection, such as the Internet, to connect to a computer belonging to the network.

The Internet is a loosely organized network of computers spanning the globe. Client computers, such as home computers, can connect to other clients and servers on the Internet through a local or regional Internet Service Provider ("ISP") that further connects to larger regional ISPs or directly to one of the Internet's "backbones." Regional and national backbones are interconnected through long range data transport connections such as satellite relays and undersea cables. Through these layers of interconnectivity, each computer connected to the Internet can connect to every other (or at least a large percentage) of other computers on the Internet. Utilizing the Internet, a user may connect to any of the networks within the Internet.

The arrangement of the Internet, however, presents a whole host of security concerns. These concerns revolve mainly around the fact that communications between a client computer and a server computer residing in a remote network may travel through a wide variety of other computers and networks before arriving at their eventual destinations. If these communications are not secured, they are readily accessible to anyone with a basic understanding of network communication protocols. To alleviate these security concerns, a virtual private network or VPN may be established between a client computer and another network. A VPN may allow private and secure communications between computers over a public network, while maintaining privacy through the use of a tunneling protocol and security procedures. These tunneling protocols allow traffic to be encrypted at the edge of one network or at an originating computer, moved over a public network like any other data, and then decrypted when it reaches a remote network or receiving computer. This encrypted traffic acts like it is in a tunnel between the two networks or computers: even if an attacker can see the traffic, they cannot read it, and they cannot change the traffic without the changes being seen by the receiving party and therefore being rejected.

VPNs are similar to wide area networks (WAN), but the key feature of VPNs is that they are able to use public networks like the Internet rather than rely on expensive, private leased lines. At they same time, VPNs have the same security and encryption features as a private network, while adding the advantage of the economies of scale and remote accessibility of large public networks.

VPNs today are set up a variety of ways, and can be built over ATM, frame relay, and X.25 technologies. However, the most popular current method is to deploy IP-based VPNs, which offer more flexibility and ease of connectivity. Since most corporate intranets use IP or Web technologies, IP-VPNs can more transparently extend these capabilities over a wide network. An IP-VPN link can be set up anywhere in the world between two endpoints, and the IP network automatically handles the traffic routing.

A VPN, however, is not without its flaws. First of all, to establish a VPN, both computers must utilize identical VPN protocols. As there are a wide variety of VPN protocols in use, such as PPTP, IPsec, L2TP etc. this is by no means guaranteed. If identical protocols are not originally on one or more of the computers, identical protocols must be installed on both of these systems before a VPN may be established.

Additionally, even if the computers are running the same protocol, this protocol may still have to be manually setup and configured. In many cases, every time a remote user wishes to establish a VPN with a computer over an existing network he must bring up the VPN protocol he wishes to use and properly configure it to work with the remote computer or network he wishes to access.

These installation and configuration issues may present problems to someone who is not well versed in the area of network protocols, and may even present problems for those who are familiar with these protocols, as typically a remote user must configure his computer without access to the gateway to which he wishes to connect.

Even more problematic, however, is that setting up a VPN still presents security issues. Almost universally, a gateway at a remote network is not going to establish a VPN with a random remote computer, In most cases, the remote gateway requires a username and a password before it will establish a VPN connection. This username and password is sent from the remote user in an unsecured form, or encrypted using a weak encryption algorithm. As this username and password are easily snooped by malicious users of a public network, a security hole exists within the very process of trying to create a VPN to provide greater security.

Thus, a need exists for more secure methods and systems for establishing a secure connection between computers which require minimum amounts of manual configuration.

SUMMARY OF THE DISCLOSURE

Systems and methods for establishing or providing a secure connection between networked computers are disclosed. A computer may make a request for a secure connection to another computer. In response, configuration data may be sent to the requesting computer. This configuration data may execute on the requesting computer in order to create a secure connection between the two computers. Using this secure connection, data may be passed between the two computers with a greater degree of privacy.

Furthermore, protocols inherent to particular operating systems may be utilized to setup and establish a secure connection between networked computers in an automated fashion, requiring no manual intervention or configuration by the user of a computer. The configuration data sent to the requesting computer may automatically configure a protocol on the requesting computer and automatically establish a secure connection with another networked computer.

In one embodiment, a connection is requested in a first protocol, data is sent in response to the request, a second protocol is configured using the data and a secure connection is established using the second protocol.

In another embodiment, the first protocol is HTTPS.

In yet another embodiment, the data is sent using the first protocol.

In other embodiments, the request for the connection includes a username and a password.

In still other embodiments, data is sent only if the username and password are verified.

In yet other embodiments, the data includes a controller.

In some embodiments, the controller is an Active X controller.

In a particular embodiment, the data includes a credential and the secured connection is established using the credential.

In one embodiment, the credential is dynamically generated in response to the request and includes a password and a username.

In additional embodiments, the credential is valid only for the duration of the secure connection.

In other embodiments, the second protocol is PPTP and is configured automatically using the controller.

In one embodiment, the secure connection is established automatically using the controller.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 5 includes an illustration of another exemplary architecture where embodiments of the systems and methods of the present invention may find applicability.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. After reading the specification, various substitutions, modifications, additions and rearrangements will become apparent to those skilled in the art from this disclosure which do not depart from the scope of the appended claims.

Initially, a few terms are defined to aid the reader in an understanding of the following disclosure. The term "controller" is intended to mean any set of data or instructions operable to perform certain tasks or a combination of hardware (such as a processor) and software instructions capable of performing a certain task.

The term "networked" is intended to mean operable to communicate. For example, two networked computers are operable to communicate with one another using techniques known in the art, such as via a wireless or wired connection using TCP/IP. Two computers may be networked through a variety of networks, sub-networks, etc.

Figure 1:
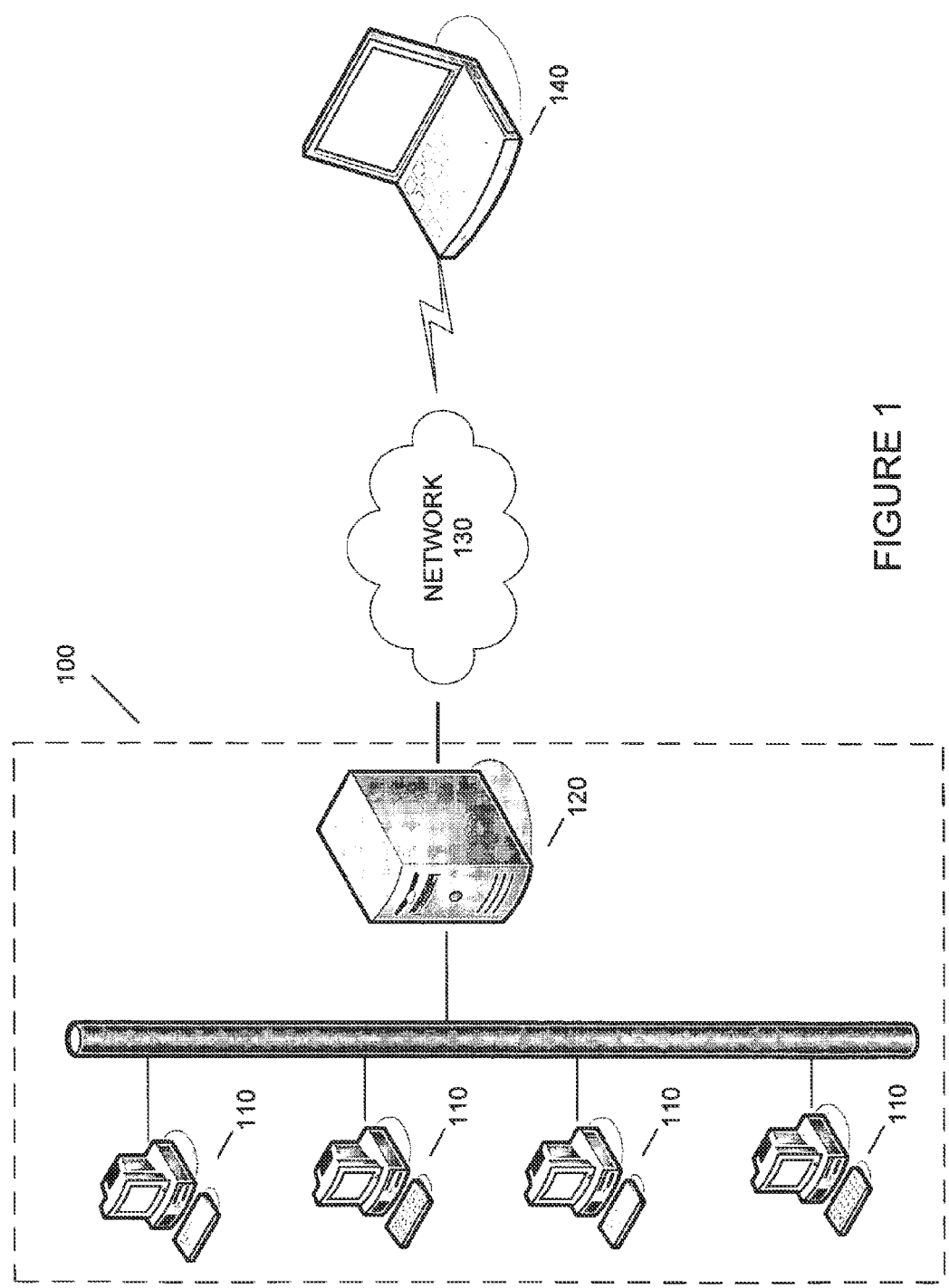
FIG. 1 includes an illustration of exemplary architecture for use in describing various embodiments of the systems and methods of the present invention.

Before discussing embodiments of the present invention, an exemplary architecture for use in illustrating embodiments of the present invention is described. It will be apparent to those of ordinary skill in the art that this is a simple architecture intended for illustrative embodiments only, and that the systems and methods described herein may be employed with any variety of more complicated architectures. Each of the computers depicted may include desktops, laptops, PDAs or any other type of device capable of communicating, either via wireless or wired connection, over a network. Each network depicted, whether they be intranets or any other type of network, may include sub-networks or any combination of networks and sub-networks FIG. 1 illustrates just such an exemplary architecture. In FIG. 1, intranet 100 is a private network composed of client computers 110 and server 120. Client computers 110 may be coupled to server 120, which is in turn coupled to public network 130, such as the Internet. Client computers 110 may not be coupled directly to public network 130. Therefore, to access public network 130, client computers 110 may communicate with server 120, which in turn serves as a gateway to public network 130 as is commonly known in the art. Data residing within intranet 100 may be sensitive. Consequently, server 120 may also serve as a firewall for intranet 100, preventing unauthorized users on public network 130 from accessing intranet 100. Remote client computer 140 may also be coupled to public network 130 via a wired or wireless connection, as is known in the art. Therefore, remote client computer 140 and server 120 may be capable of communication via public network 130. For example, server 120 may serve both as a firewall to protect intranet data and a gateway to permit secured access to the intranet and all computers and servers hosted therein by remote client computer 140.

Attention is now directed to systems and methods for establishing a secure connection between two computers over a network according to one embodiment of the invention. Typically, a user at a remote client computer wishes to establish a connection with an intranet or a computer within an intranet. To accomplish this, the remote client computer and a server computer belonging to the intranet may create a VPN so information may be securely transferred between the remote client computer and the server computer or other computers within the intranet. To securely establish this VPN with a minimum of configuration, the remote client computer may make a request for a VPN connection to the server. In response, the server may send configuration data to the remote client computer. This configuration data may execute on the remote client computer in order to create a secure VPN connection between the remote client and the server. Using this secure connection, data may be passed between server and remote client with a greater degree of privacy.

These systems and methods may be explained in more detail with reference to the exemplary hardware architecture of FIG. 1. Suppose a user at remote client computer 140 wishes to securely interact with intranet 100. To accomplish this, remote client computer 140 can request a secure connection from server 120 over network 130. In response, server 120 may send configuration data to remote client computer 140. Using this configuration data, a secure connection may be established between remote client computer 140 and server computer 120, after which remote computer 140 may interact with computers 110, 120 of intranet 100 as if remote computer 140 belonged to intranet 100.

In one particular embodiment, to obtain connectivity between remote client computer 140 and server 120 a transient VPN may be established between server 120 and remote client computer 140 using public network 130. This transient VPN may provide a dynamic, secure connection between remote client computer 140 and server 120 by creating a transient VPN endpoint on remote client computer 140 that connects through a VPN tunnel to server 120. This VPN connection may be established using a wide variety of VPN protocols, as are known in the art, such as PPTP, IPsec, L2TP, etc.

Furthermore, protocols inherent to particular operating systems may be utilized to setup and establish a transient VPN endpoint on remote client computer 140 in an automated fashion, requiring no manual intervention or configuration by the user of remote client computer 140. For example, suppose remote computer 140 and server are both executing a Windows based operating of the type developed by Microsoft, such as Windows98, WindowsXP, Windows2000, etc. As Windows based operating system have the PPTP VPN protocol built into them, this protocol may be used advantageously to automatically establish a VPN between remote client computer 140 and server 120 if both are executing a Windows based operating system.

Figure 2:
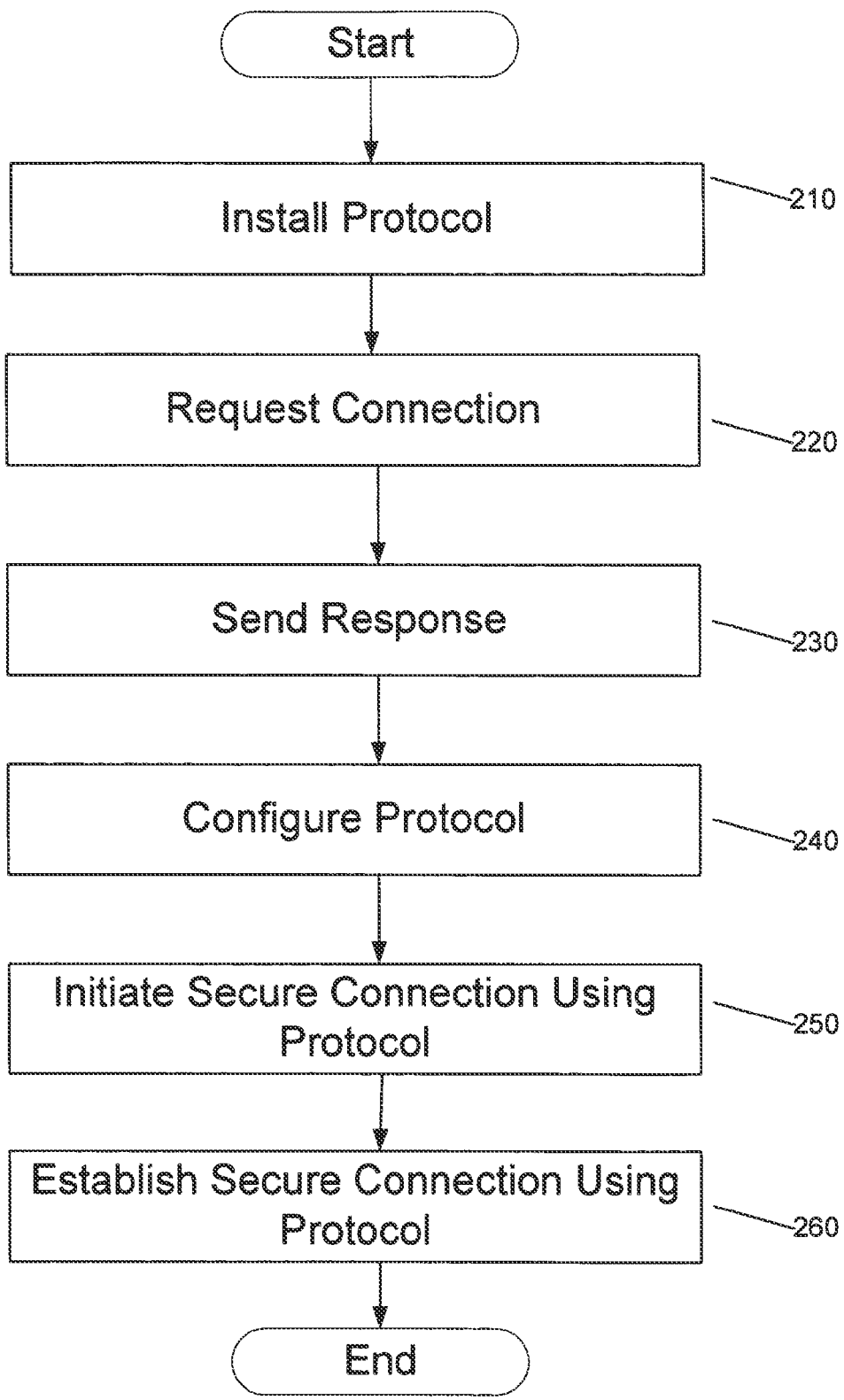
FIG. 2 includes a flow diagram of one embodiment of a method for establishing a secure connection between two computers.

Turning now to FIG. 2, a flow diagram for one method of establishing a secure connection between networked computers is depicted. To establish a secure connection between two networked computer, the first step may be to ensure that the protocol to be utilized in establishing this secure connection is installed on both computers, and if it is not, to install the desired protocol on the computer(s) that do not have it (Step 210). For example, if a VPN connection is desired between remote client computer 140 and server computer 120 a wide variety of VPN protocols may be used to establish this connection, such as IPsec, L2TP, PPTP, MPLS etc. If, however, it is desired to use IPsec and remote client computer 140 does not have the IPsec protocol installed or configured, it may be necessary to install the IPsec protocol (Step 210) on remote client computer 140 before this particular protocol may be utilized in establishing a VPN connection. This installation may only need to occur once, and may, for example, be accomplished by an IT manager responsible for intranet 110 or remote client computer 140.

At any time after the desired protocol is installed on the computers (Step 210), a secure connection may be requested by one of the computers (Step 220). For example, remote client computer 140 may request a secure connection from server computer 120. This request (Step 220) may be in any format used to communicate over the network connection between the two computers, such as FTP, HTTP or HTTPS. In response to this request (Step 220), a response may be sent to the requesting computer (Step 230). This response (Step 230) may be sent to the requesting computer using the same format used in the initial request (Step 220), such as FTP, HTTP or HTTPS, and include a set of data designed to establish a secure connection between the two computers using a particular protocol. This set of data may comprise a controller configured to execute on the requesting computer and a set of credentials to be used in conjunction with the controller.

The set of data sent in this response (Step 230) may provide information to be utilized by a protocol on the requesting computer when connecting to a particular networked computer using the protocol (Step 240). This information may include the IP address or host name of a server, the authentication domain name, whether MPPC is to be utilized, which call-control and management protocol is to be used, a DNS configuration etc. Providing this information to the protocol may be referred to as "configuring a protocol" and that phrase will be used as such herein. In some instances, a controller contained in the response to the requesting computer executes on the initiating computer and configures the protocol to establish a secure connection using the credentials contained in the response (Step 230).

After this configuration process (Step 240), a secure connection may be initiated using the configured protocol (Step 250), and a secure connection established (Step 260). In some instances, a request for a secure connection may be initiated by the same controller responsible for configuring the protocol, and include the credentials contained in the sent response (Step 230). After verifying the credentials a secure connection may be established (Step 260).

It will be clear to those of ordinary skill in the art that the method depicted in the flow diagram of FIG. 2 may be tailored to implement a secure connection between two computers in a variety of architectures, and may employ a variety of different protocols for the various communications and secure connections.

Note that FIG. 2 represents one embodiment of the invention and that not all of the steps depicted in FIG. 2 are necessary, that a step may not be required, and that further steps may be utilized in addition to the ones depicted, including steps for communication, authentication, configuration etc. Additionally, the order in which each step is described is not necessarily the order in which it is utilized. After reading this specification, a person of ordinary skill in the art will be capable of determining which arrangement of steps will be best suited to a particular implementation.

In fact, embodiments of the methods and systems of the present invention may be particularly useful in establishing a secure connection between two computers by automatically configuring a protocol built into an operating systems executing on both of the computers, alleviating the need for a user to install or configure such a protocol manually.

Figure 3:
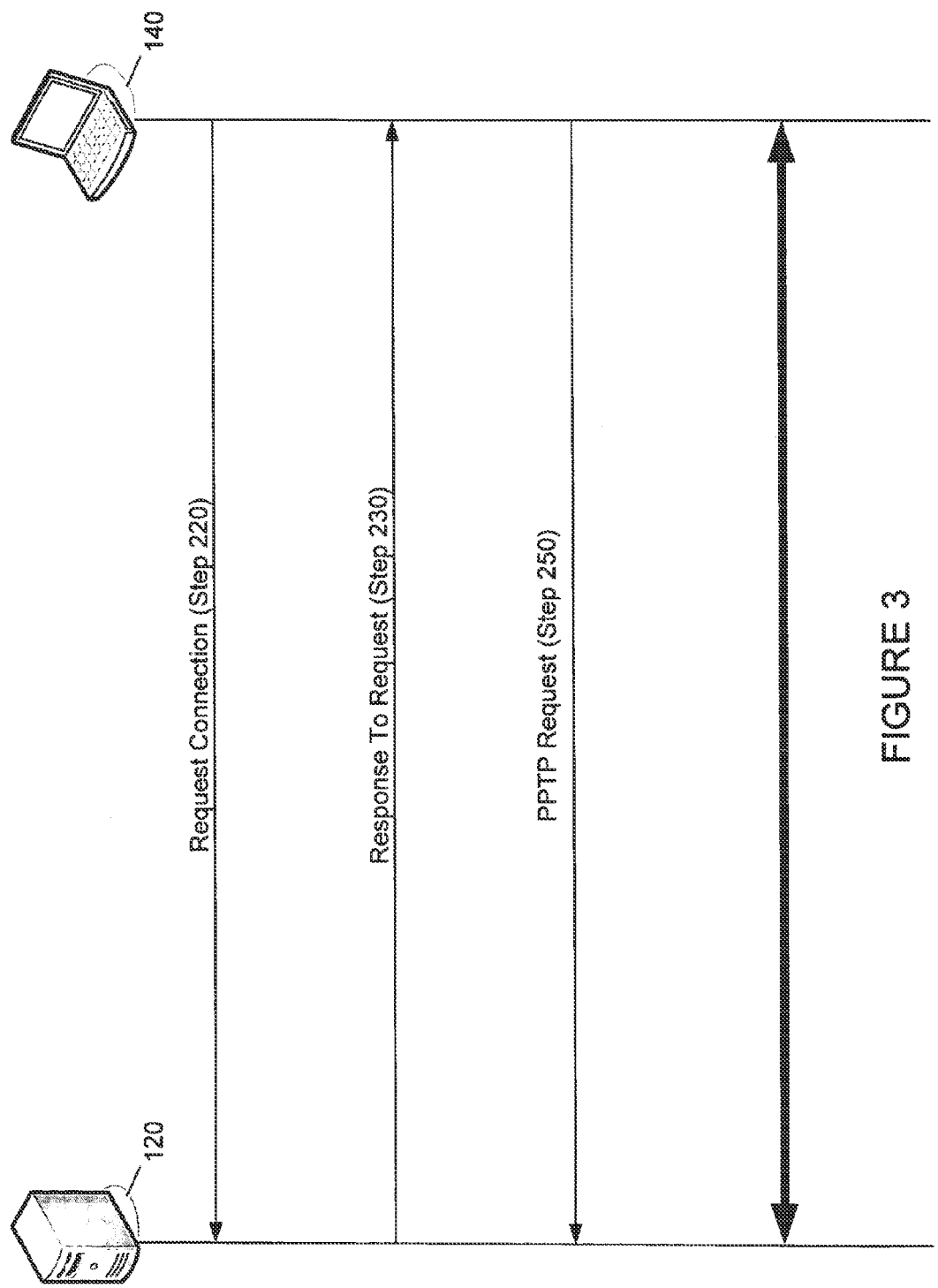
FIG. 3 includes a representation of applying an embodiment of a method for establishing a secure connection to portions of the architecture depicted in FIG. 1.

FIG. 3 depicts one embodiment of a method for automatically establishing a transient VPN connection between a remote client computer and a server both executing a Windows based operating system containing the point-to-point tunneling protocol (PPTP) for establishing VPNs. Remote client computer 140 may send a connection request (Step 220) to server computer 120 indicating that remote client computer 140 wishes to establish a VPN connection with server 120. This request may be initiated by a user at remote computer 140. Though this request may be initiated in a variety of ways, in many instances a user at remote client computer 140 may initiate this request using an HTTP client. For example, via an internet browser of the type commonly know in the art, such as Netscape or Internet Explorer.

Using this browser, a client at remote client computer 140 may navigate to a particular URL in a known manner, perhaps by typing it directly into an address window within the browser, accessing the URL in his bookmarks file, or navigating to the URL by clicking on an HTTP link within a page. By pointing his browser to a particular URL, the user at remote client computer 140 initiates a connection request to server 120 computer. This URL may also contain an HTML form requesting a username and password from a user at remote computer 140, in order to authenticate a user at remote computer 140. In some embodiments, this connection request (Step 220) is sent from HTTP client on remote client computer 140 to server 120 using HTTP. However, to better secure the connection request, in other embodiments the connection request from remote client computer 140 to server computer is made using HTTPS, which may be sent via an SSL connection between remote client computer 140 and server computer 120.

In response to the connection request (Step 220) from remote client computer 140, server computer 120 may send data to remote client computer 140 which will facilitate the establishment of a VPN connection between server and remote client computer (Step 230). If the connection request (Step 220) from remote client computer 140 contained a username or password, server computer 120 may first authenticate or authorize the requesting user at remote client computer 140. Logic on server computer 120 may verify the username or password submitted in the connection request (Step 220) possibly by authenticating them against a form of user database (RADIUS, LDAP, etc.). If the user's authentication profile permits, server 120 may then send a response to remote client computer 140 with the configuration data (Step 230). This data may include VPN client software designed to utilize a VPN protocol on remote client computer 140 to automatically establish a secure VPN connection between server computer 120 and remote client computer 140 without any action by the user of remote client computer 140.

In one specific embodiment, the VPN client software is sent to remote client computer 140 using HTTPS, and includes a controller designed to establish a secure VPN connection between server 120 and remote client computer 140, and a set of credentials. These credentials may be session specific, and dynamically generated by server computer 120 using a random-seed. Additionally, this VPN client software may be digitally signed with an X.509 digital certificate, of the type know in the art, so that remote client computer 140 recognizes that the origin of the VPN client software is server computer 120. Once the origin of VPN client software is verified, it may then be installed or executed on remote client computer 140 to establish a secure VPN connection.

Figure 4:
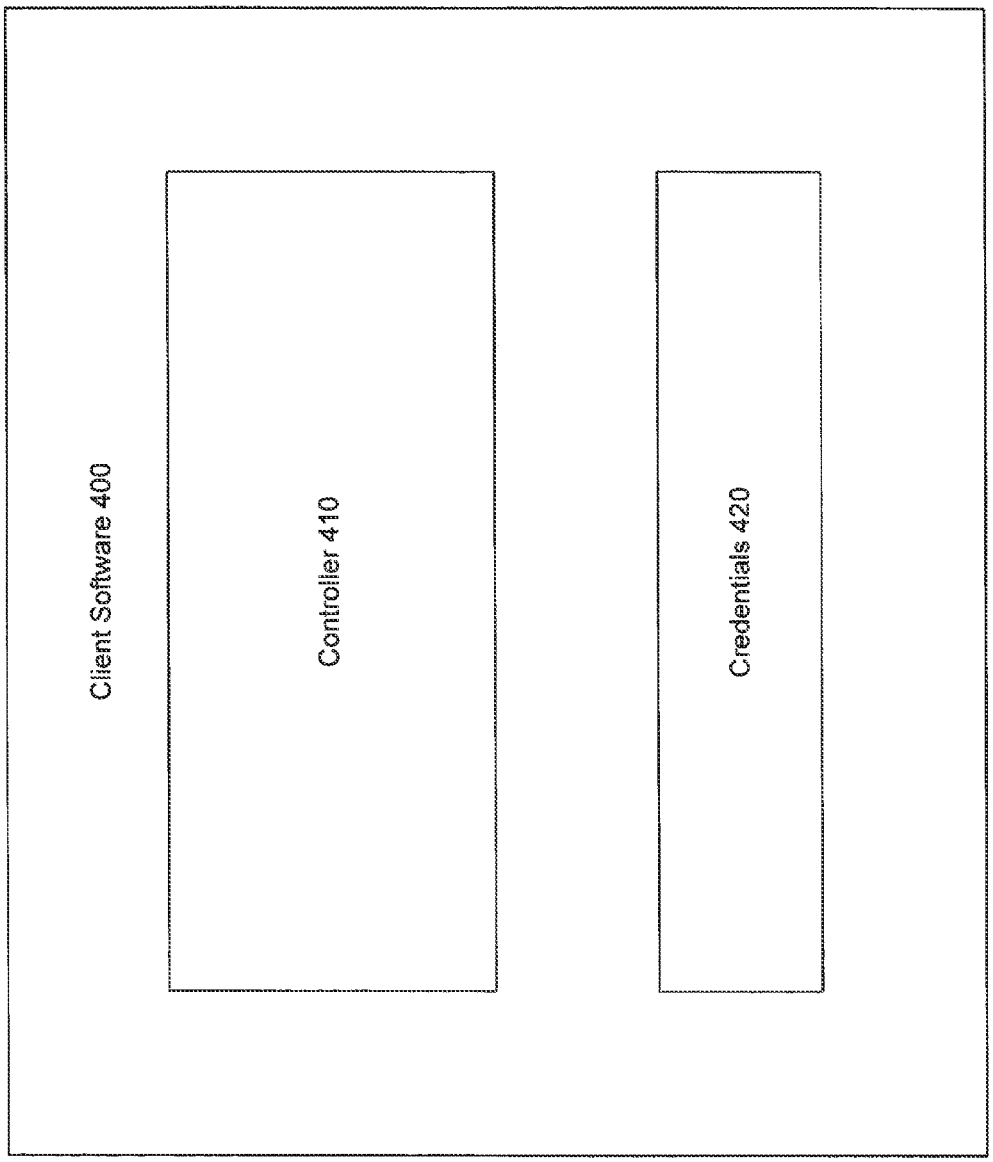
FIG. 4 includes a representation of one embodiment of VPN client software.

FIG. 4 depicts a block diagram of one embodiment of the client software which may be sent from server computer 120 to remote client computer 140 (Step 230). VPN client software 400 may include controller 410 designed to configure a protocol on remote client computer 140 and establish the VPN connection between server 120 and remote client computer 140. In many cases, this controller 410 is designed to utilize a VPN protocol resident on remote client computer 140 to establish this connection. This controller may be written in a variety of programming or scripting languages as are known in the art, such as C, C++, Java, etc.

Once VPN client software 400 is downloaded and controller 410 executed, controller 410 may establish a secure VPN connection between remote client computer 140 and server 120. To continue with the above example, remote client computer 140 may be executing a Windows based operating system, and controller 410 may be an Active X controller designed specifically to configure the PPTP bundled in the Windows operating system software. Therefore, once VPN client software 400 is downloaded to remote client computer 140, Active X controller 410 may execute automatically on remote client computer 140, making system library calls to configure the PPTP resident on remote client computer 140 as a PPTP client.

Using the configured PPTP client, Active X controller 410 may then automatically establish a secure VPN connection with server computer 120. This secure connection may be automatically established by controller 410 by making additionally system library calls on remote client computer 140 to initiate a tunnel request (Step 240) from remote client computer 140 to server computer 120. As noted above, PPTP libraries are installed with most Windows based operating systems. Thus, Active X controller executing on remote client computer 140 may configure the PPTP to establish a secure VPN connection with remote server and initiate a tunnel request, without any interference or input by a user of remote client computer 140.

Additionally, in some embodiments, controller 410 may utilize credentials 420 in establishing the secure VPN connection between server computer 120 and remote client computer 140. As mentioned above, credentials 420 may have been dynamically generated by server computer 120 and sent in the response (Step 230) to initial connection request (Step 220). Credentials 420 may contain a password and username. Controller 410 may use this username and password as parameters when establishing the VPN connection between remote client computer and server computer. Credentials may be sent with tunnel request (Step 250) and verified by server computer 120 before establishing a VPN connection with remote computer 140. Since server computer 120 initially created credentials 420, server may identify the credentials from remote client computer 140 and associate a particular VPN connection with a particular remote client computer.

Credentials 420, including the username and password may then be used for the duration of that particular session between remote client computer 140 and server computer 140. Once the VPN connection between remote client computer and server computer is severed, username and password may lose their validity, preventing their unauthorized use in the future.

Embodiments of the systems and methods disclosed will be useful in a variety of architectures, as will be apparent to those of skill in the art after reading this disclosure. FIG. 5 depicts an example of another architecture where these systems and methods might find useful application. Wireless router 510 and server 512 may serve as wireless access point 514 to Internet 520, as is known in the art. Remote client computer 140 may be wirelessly coupled to server 512 and Internet 520 through router 510 in a public venue. In this architecture, embodiments of these systems and methods may be utilized to secure wireless communications, in a public venue, between remote client computer 140 and access point 514, securing the public wireless network segment, without the need for pre-shared keys or passphrases.

For example, after remote client computer 140 enters the range of wireless router 510, remote client computer 140 may associate with access point 514. Remote client computer 140 may then request a secure connection with server 512 via a browser based interface. Client software 400, including controller 410 and credentials 420 may be downloaded to remote client computer 140 using HTTPS, at which point the controller automatically configures the PPTP on remote client computer 140 and establish a VPN tunnel between remote client computer 140 and wireless access point 514. From this point, wireless communications between remote client computer and access point 514 may be made using this VPN tunnel, and are therefore, more secure.

Although the present disclosure has been described in detail herein with reference to the illustrative embodiments, it should be understood that the description is by way of example only and is not to be construed in a limiting sense. It is to be further understood, therefore, that numerous changes in the details of the embodiments disclosed herein and additional embodiments will be apparent to, and may be made by, persons of ordinary skill in the art having reference to this description. Accordingly, the scope of the present disclosure should be determined by the following claims and their legal equivalents.

What is claimed is:

1. A method for establishing transient secure wireless communications between a wireless access point (WAP) and one or more client computers, comprising:
    at the WAP, receiving a request from a client computer for a secure connection to the WAP;
    dynamically generating session-specific-credentials;
    utilizing information extracted from the request from the client computer to select a controller to automatically run in the client computer;
    preparing by the WAP a response containing the controller and the session-specific credentials;
    sending the response containing the controller and the session-specific credentials from the WAP to the client computer;
    configuring by the controller a tunneling protocol on the client computer; and
    establishing the secure connection between the client computer and the WAP using the tunneling protocol configured by the controller and the session-specific credentials, wherein the session-specific credentials are valid until the secure connection between the client computer and the WAP is severed.

2. A method according to claim 1, wherein the response prepared by the WAP and sent to the client computer includes configuration information required by the controller to automatically run on the client computer.

3. A method according to claim 1, wherein after the controller is downloaded to the client computer the controller has access to an operating system executing on the client computer.

4. A method according to claim 1, wherein the controller is selected by the WAP utilizing information extracted from the request received from the client computer.

5. A method according to claim 1, wherein the controller is an Active X controller.

6. A method according to claim 1, further comprising dynamically generating session-specific credentials at the WAP.

7. A method according to claim 6, wherein the session-specific credentials are generated using a random-seed.

8. A method according to claim 1, wherein the tunneling protocol is part of an operating system running on the client computer.

9. A method according to claim 1, wherein the tunneling protocol is a virtual private network protocol.

10. A method according to claim 9, wherein the virtual private network protocol is IPsec, L2TP, PPTP, or MPLS.

11. A method according to claim 1, wherein the request is received from the client computer via FTP, HTTP, or HTTPS.

12. A method according to claim 1, wherein the response containing the controller and the session-specific credentials is sent from the WAP to the client computer using FTP, HTTP, or HTTPS.

13. A method according to claim 1, further comprising sending information from the WAP to the client computer, wherein the information comprises an IP address, a host name, an authentication domain name, a domain name service configuration, or a combination thereof.

14. A method according to claim 13, wherein the information further comprises call-control and management protocol data, point-to-point compression protocol data, or both.

15. A method according to claim 1, wherein the request from the client computer is sent via a wired or wireless connection to the WAP.

16. A method according to claim 1, wherein the response containing the controller and the session-specific credentials is sent from the WAP via a wired or wireless connection to the client computer.

17. A computer program product comprising at least one non-transitory computer readable medium storing instructions translatable by at least one processor to perform:
    at a wireless access point (WAP), dynamically generating session-specific-credentials;
    utilizing information extracted from the request from the client computer to select a controller to automatically run in the client computer;
    preparing a response to a request from a client computer for a secure connection to the WAP, the response containing the controller and the session-specific credentials; and
    sending the response containing the controller and the session-specific credentials from the WAP to the client computer, wherein after being downloaded to the client computer the controller configures a tunneling protocol on the client computer and establishes the secure connection between the client computer and the WAP using the tunneling protocol configured by the controller and the session-specific credentials, wherein the session-specific credentials are valid until the secure connection between the client computer and the WAP is severed.

18. A computer program product according to claim 17, wherein the response prepared by the WAP and sent to the client computer includes configuration information required by the controller to automatically run on the client computer.

19. A computer program product according to claim 17, wherein after the controller is downloaded to the client computer the controller has access to an operating system executing on the client computer.

20. A computer program product according to claim 17, wherein the controller is selected by the WAP utilizing information extracted from the request received from the client computer.

21. A computer program product according to claim 17, wherein the controller is an Active X controller.

22. A computer program product according to claim 17, wherein the session-specific credentials are generated using a random-seed.

23. A computer program product according to claim 17, wherein the tunneling protocol is part of an operating system running on the client computer.

24. A computer program product according to claim 17, wherein the tunneling protocol is a virtual private network protocol.

25. A computer program product according to claim 24, wherein the virtual private network protocol is IPsec, L2TP, PPTP, or MPLS.

26. A computer program product according to claim 17, wherein the request is received from the client computer via FTP, HTTP, or HTTPS.

27. A computer program product according to claim 17, wherein the response containing the controller and the session-specific credentials is sent from the WAP to the client computer using FTP, HTTP, or HTTPS.

28. A computer program product according to claim 17, wherein the instructions are further translatable by the at least one processor to perform:
- sending information from the WAP to the client computer, wherein the information comprises an IP address, a host name, an authentication domain name, a domain name service configuration, or a combination thereof.

29. A computer program product according to claim 28, wherein the information further comprises call-control and management protocol data, point-to-point compression protocol data, or both.

30. A computer program product according to claim 17, wherein the request from the client computer is sent via a wired or wireless connection to the WAP.

31. A computer program product according to claim 17, wherein the response containing the controller and the session-specific credentials is sent from the WAP via a wired or wireless connection to the client computer.

32. A method for establishing transient secure wireless communications between a wireless access point (WAP) and one or more client computers, comprising:
- at the WAP, receiving a request from a client computer for a secure connection to the WAP;
- dynamically generating session-specific-credentials;
- utilizing information extracted from the request from the client computer to select a controller to automatically run in the client computer;
- preparing by the WAP a response containing the session-specific credentials and configuration information required by a controller residing on the client computer;
- sending the response containing the session-specific credentials and the configuration information required by the controller from the WAP to the client computer;
- configuring by the controller a tunneling protocol on the client computer; and
- establishing the secure connection between the client computer and the WAP using the tunneling protocol configured by the controller and the session-specific credentials, wherein the session-specific credentials are valid until the secure connection between the client computer and the WAP is severed.

33. A method according to claim 32, wherein the secure connection is established by automatically running the controller on the client computer.

34. A method according to claim 32, wherein the request from the client computer is sent via a wired or wireless connection to the WAP.

35. A method according to claim 32, wherein the response containing the controller and the session-specific credentials is sent from the WAP via a wired or wireless connection to the client computer.

36. A computer program product comprising at least one non-transitory computer readable medium storing instructions translatable by at least one processor to perform:
- at a wireless access point (WAP), dynamically generating session-specific-credentials;
- utilizing information extracted from the request from the client computer to select a controller to automatically run in the client computer;
- preparing a response to a request from a client computer for a secure connection to the WAP, the response containing the session-specific credentials and configuration information required by a controller residing on the client computer; and
- sending the response containing the session-specific credentials and the configuration information required by the controller from the WAP to the client computer, wherein the controller configures a tunneling protocol on the client computer and establishes the secure connection between the client computer and the WAP using the tunneling protocol configured by the controller and the session-specific credentials, and wherein the session-specific credentials are valid until the secure connection between the client computer and the WAP is severed.

37. A computer program product according to claim 36, wherein the secure connection is established by automatically running the controller on the client computer.

38. A computer program product according to claim 36, wherein the request from the client computer is sent via a wired or wireless connection to the WAP.

39. A computer program product according to claim 36, wherein the response containing the controller and the session-specific credentials is sent from the WAP via a wired or wireless connection to the client computer.

* * * * *